United States Patent [19]

Sugiura et al.

[11] 4,181,417

[45] Jan. 1, 1980

[54] SHUTTER OPERATION CONTROL DEVICE FOR A PHOTOGRAPHIC CAMERA

[75] Inventors: Yoji Sugiura, Yokohama; Nobuo Tezuka, Tokyo; Ryoichi Yoshikawa; Uchidoi Masanori, both of Yokohama, all of Japan

[73] Assignee: Canon Kabushiki Kaisha, Tokyo, Japan

[21] Appl. No.: 886,352

[22] Filed: Mar. 14, 1978

[30] Foreign Application Priority Data

Mar. 16, 1977 [JP] Japan .................................. 52/28968
Apr. 15, 1977 [JP] Japan .................................. 52/43342

[51] Int. Cl.$^{2}$ ........................ G03B 19/12; G03B 9/08; G03B 9/64

[52] U.S. Cl. .................................... 354/152; 354/234; 354/238; 354/268

[58] Field of Search ...................... 354/60 R, 152, 238, 354/234, 266-268, 289, 258

[56] References Cited

U.S. PATENT DOCUMENTS

| | | | |
|---|---|---|---|
| 3,557,677 | 1/1971 | Schubert | 354/234 |
| 3,930,263 | 12/1975 | Urano | 354/268 |
| 4,015,198 | 3/1977 | Iwashita et al. | 354/234 X |
| 4,034,390 | 7/1977 | Urano et al. | 354/268 X |
| 4,099,192 | 7/1978 | Aizawa et al. | 354/234 |

*Primary Examiner*—L. T. Hix
*Assistant Examiner*—William B. Perkey
*Attorney, Agent, or Firm*—Toren, McGeady and Stanger

[57] ABSTRACT

A single lens reflux camera of the type in which actuation of a first electromagnet causes sequential operation of the diaphragm, mirror and shutter, and in which the start of the opening operation of the shutter is followed, after an electronically timed interval, by actuation of a second electromagnet which controls closing operation of the shutter. In one embodiment, a device for preventing faulty operation of the shutter includes a voltage detector responsive to the drop of voltage of a battery below a satisfactory operating level for preventing the first electromagnet from being actuated when the shutter button is depressed, and an arresting mechanism arranged upon detection of abnormal operation of the second electromagnet at the start of operation of the mirror to stop a mirror drive means from further movement which would otherwise cause actuation of the shutter release.

14 Claims, 8 Drawing Figures

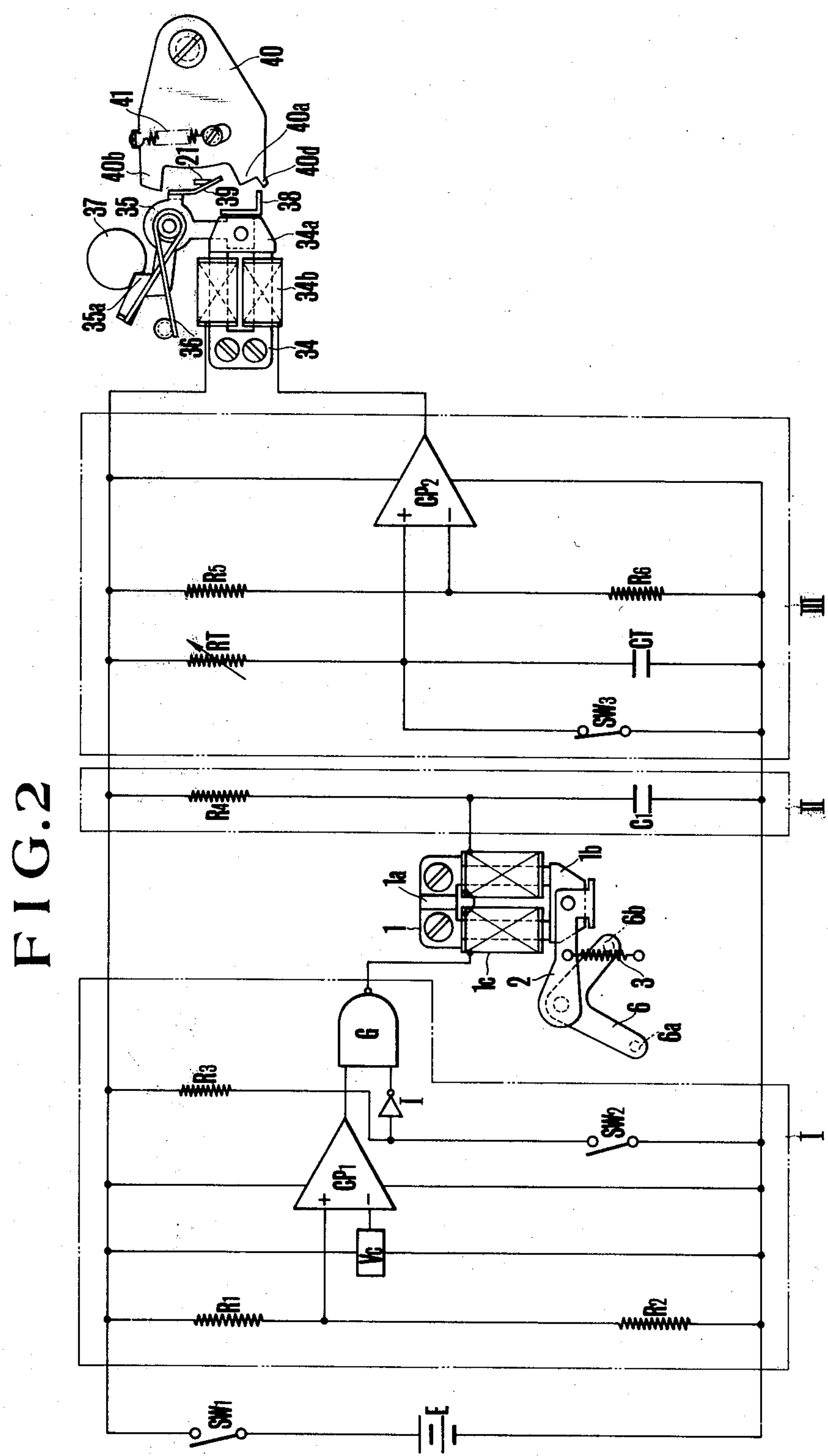
F I G.2

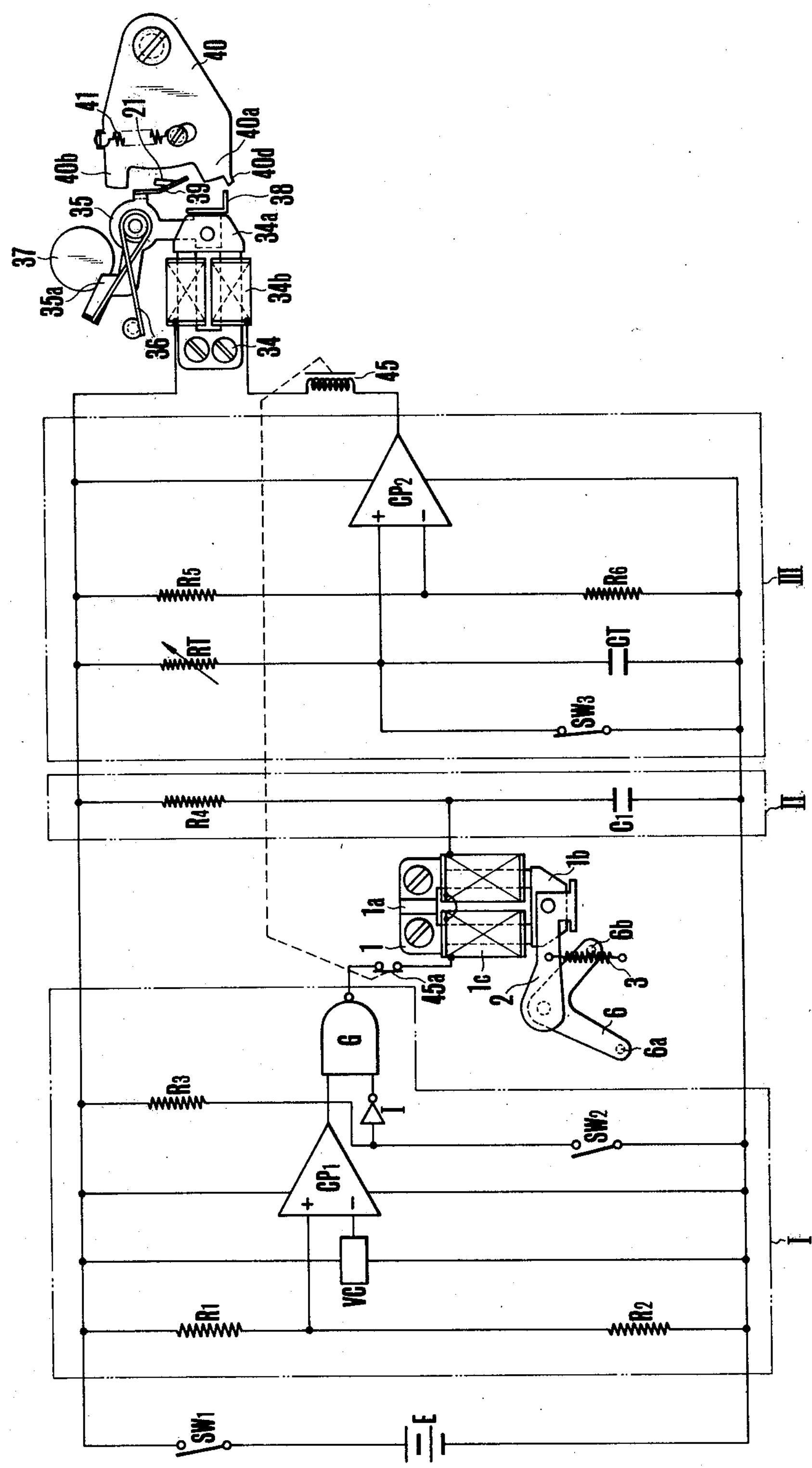
F I G.6
40
40a
40b
40d
41
21
39
38
35
34a
37
35a
36
34
34b
45
CP2
R5
R6
RT
CT
SW3
III
R4
C1
II
1a
1b
1
1c
6b
45a
2
3
6
6a
G
R3
SW2
CP1
VC
R1
R2
I
SW1
E

SHUTTER OPERATION CONTROL DEVICE FOR A PHOTOGRAPHIC CAMERA

BACKGROUND OF THE INVENTION

1. Field of the Invention

This invention relates to photographic cameras having an electromagnetically activated shutter, and, more particularly, to a device for preventing faulty operation of such shutter resulting from electrical and/or mechanical damages of the control means therefor.

2. Description of the Prior Art

In controlling opening and closing operation of the shutter, it is known to make use of two electromagnets, which, when supplied with power from a battery respectively, actuate a coordinating system for the diaphragm and shutter with the resultant opening operation of the shutter and to be energized until duration of a preselected or computed exposure time is terminated. When the actual voltage of the battery falls below the satisfactory operating level for the electromagnets and particularly for the latter, or when the latch for the closing member of the shutter is not rendered effective by energization of the second-named electromagnet because of a loss in electrical energy, therefore, it is impossible to achieve accurate and reliable control of the shutter. For this reason, the prior cameras are generally provided with a locking device responsive to the drop of the battery voltage below the satisfactory operating level for locking the shutter release button.

With such locking device, however, when the actual voltage of the battery is sufficient to effect actuation of the shutter release but insufficient to retain the closing member of the shutter in the cocked position, the shutter cannot produce a correct exposure. Such faulty operation of the closing member of the shutter may be caused not only by the weakened battery but also by either electrical or mechanical damages such as the breaking of wire, burn-out of soldering, adhesion of dust or foreign particles on the active faces of the armature and yoke of the electromagnet, and deformation of those parts of the electromagnetic actuating means which are brought into intimate contact with each other. These damages are indiscernible to the operator so that incorrect exposures or blank frames of film will result.

It is an object of the present invention to provide a generally improved and more satisfactory camera of the type in which the first and second electromagnets start to be energized simultaneously with power supply from a common battery and the energization of the second electromagnet continues until the shutter control circuit produces a deactuating signal therefor.

Another object of the invention is to provide a camera of the type described, having a device for preventing faulty operation of the shutter.

In one embodiment of the device of the invention applied to a single lens reflex camera, besides the voltage detecting circuit means, there is provided a detent mechanism arranged upon detection of ineffective latch of the rear shutter curtain to stop a mirror drive means from further movement which would otherwise cause actuation of the front shutter curtain, since the second electromagnet is not sufficiently energized.

Another embodiment of the invention includes a first detecting means for detecting whether or not the voltage of the battery is above the satisfactory operating level, a second detecting means for detecting whether or not the second electromagnet is energized, and means responsive to the combined detecting result of the first and the second detecting means for controlling energization and de-energization of the first electromagnet so that when the second electromagnet is not energized at the time of the depression of the shutter button because of a certain electrical damage, the first electromagnet also is not energized to prevent a sequential operation of the diaphragm, mirror and shutter from occurring at that time.

Still another object of the invention is to provide a single lens reflex camera of the type described, having a device for preventing faulty operation of the shutter in such a manner that when the second electromagnet is not effective to latch the rear curtain, as detected by a switch at a point in time during the mirror operation after a first actuation of camera release, the shutter is permitted to operate with production of a blank or wasteful frame of film, but a next or second actuation of camera release is prevented by rendering the first electromagnet inoperative by the output of the switch, while this condition is displayed by an indicator.

These and other objects, features and advantages of the present invention will become apparent from the following detailed description taken in conjunction with the accompanying drawings in which:

BRIEF DESCRIPTION OF THE DRAWINGS

FIG. 2 is a partly elevational view and partly electrical circuit diagram of the device of FIG. 1.

FIG. 6 is a partly elevational view and partly electrical circuit diagram of another embodiment of the invention with a circuit for detecting whether or not the second electromagnet is energized being incorporated in the circuit of FIG. 2.

DESCRIPTION OF THE PREFERRED EMBODIMENTS

Figure 1:
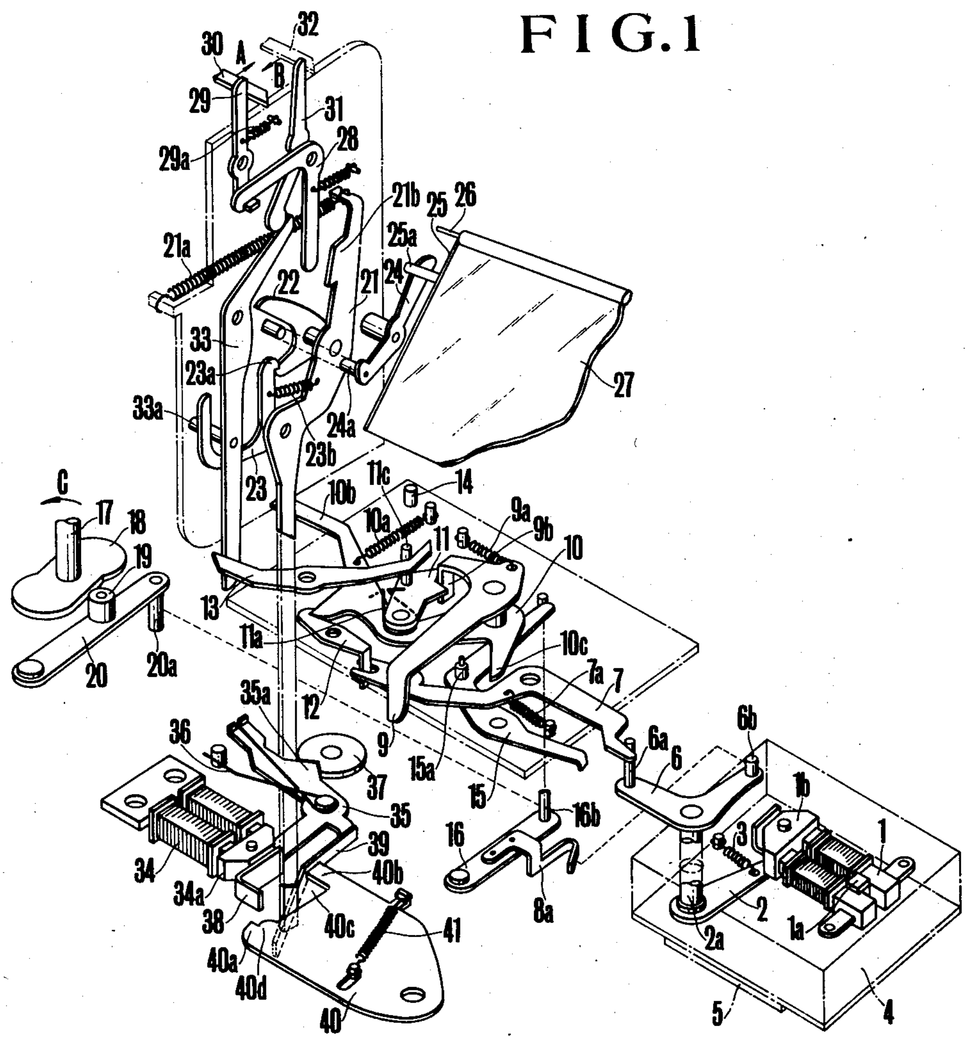
FIG. 1 is an exploded perspective view of one embodiment of the device according to the present invention applied to a single lens reflex camera, showing part of the diaphragm, mirror and shutter mechanisms and a coordinating control mechanism for these portions of the camera, the various parts being shown in shutter cocked position.
Figure 3:
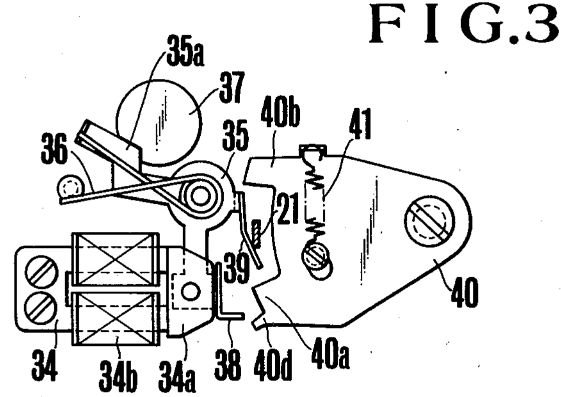
FIGS. 3, 4 and 5 are elevational views of an arresting mechanism of the device of FIG. 1 in three different operative positions, with FIG. 3 showing a state prior to camera release, with FIG. 4 showing the parts released for terminating a normal exposure, and with FIG. 5 showing the arresting mechanism in active position, because of an ineffective energization of the second electromagnet.
Figure 4:
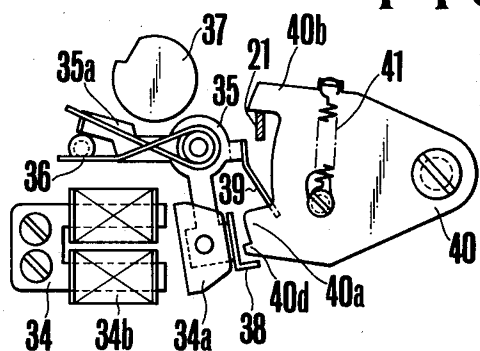

Referring to FIGS. 1 to 5, there is shown one embodiment of a device for preventing faulty operation of the shutter according to the present invention applied to a single lens reflex camera. This camera includes a shutter button responsive actuating mechanism which is composed of a first electromagnet 1, a permanent magnet 1*a* mounted in the body of electromagnet 1, an armature 1*b* carried on an arm 2 at the free end thereof, the opposite end of which is fixedly mounted on a shaft 2*a*, a drive spring 3 connected between the arm 2 and a casing 4 of non-magnetic material, upon energization of the solenoid of electromagnet 1 to move away the armature 1*b* from the electromagnet body 1 as the magnetic flux of the part 1*a* is cancelled thereby, and an output member or two-armed lever 6 fixedly mounted on the top end of the shaft 2*a*, which extends through and outwardly beyond a hole formed in the upper panel of the casing 4. The casing 4 is provided with a magnetic flux shielding member 5.

As lever 6 is turned in a counter-clockwise direction, such motion is transmitted through an upwardly extending pin 6*a* to an intermediate lever 7 and therefrom to a latch 12 for a diaphragm closing down mechanism. Lever 7 is biased by a spring 7*a* in a counter-clockwise direction with one end thereof being in normally abutting engagement with pin 6*a* and with the opposite end having a forked portion which receives a downwardly bent portion of the latch or pawl lever 12. When lever 12 is turned counter-clockwise and disengaged at its pawl from a drive lever 10, the latter is turned clockwise under the action of a spring 10*a* while simultaneously driving an operating lever 9 for clockwise rotation about a common axis of the lever 10 against the force of a return spring 9*a* in operative engagement with lever 10 through a return control lever 11. Lever 11 is pivotally mounted on lever 10 and biased by a hairpin spring 11*a* which causes lever 11 to engage with a downwardly bent portion of lever 9. The parts 9, 10 and 11 constitute the aforesaid diaphragm closing down mechanism.

Between the diaphragm closing down mechanism and a latch for a focal plane shutter (not shown) of the camera is provided a mechanism for driving a mirror 27 to flip out of the way in such a manner as to follow up the diaphragm closing down mechanism. Mirror 27 is mounted on a support frame 25 which is hinged by a pair of stub shafts 26 and which has a rod 25*a* fixedly secured at one end to the support frame 25 and beared at the opposite end on a control lever 24. The mirror drive mechanism further includes a drive lever 21 biased by a tension spring 21*a* which is connected between the top end of lever 21 and a framework of the camera housing so that the opposite end of lever 21 is in normally abutting engagement with one arm 10*b* of diaphragm drive lever 10. Pivotally mounted on a common axis of lever 21 is a return control lever 22 having spaced fingers for moving one end of an elongated pin 24, the opposite end of pin 24*a* being secured to the opposite end of control lever 24 to that bearing rod 25*a*. Lever 22 is latched in active position by a pawl lever 23 pivotally mounted on lever 21. Lever 21 is biased by a spring 23*b* which urges the pawl 23*a* for latching engagement with the lower finger of return control lever 22.

A mechanism for actuating a release of the front curtain of the shutter at a time when mirror 27 has flipped up to clear the path of light to a film (not shown) includes a sensor or lever 28 with a probe extending into the path of movement of a lug 21*b* of the mirror drive lever 21, and a drive lever 29 arranged between the pawled arm of lever 28 and a latch lever 30 upon completion of the full movement of mirror 27 as sensed by lever 28 to drive the latch lever 30 for movement in a direction indicated by arrow A, as lever 28 is turned clockwise to disengage at its pawl from lever 29 against the force of a bias spring 28 which is stronger than a drive spring 29*a*.

A mechanism for actuating a release of the rear curtain of the shutter at a time when a preset or computed shutter time has been terminated comprises a second electromagnet 34, an armature 34*a* carried on one end of a L-shaped lever 35, the latter being biased by a hairpin spring 36 which tends to move the armature 34*a* away from the body of electromagnet 34, and a cam disk 37 connected to control means for controlling closing operation of the rear curtain, the disk 37 having a cam notch interacting with a protuberance 35*a* on L-shaped lever 35. When the solenoid of electromagnet 34 is de-energized, lever 35 is turned in a counter-clockwise direction under the action of spring 36 with protuberance 35*a* retracted from the cam notch to permit an actuation of release of the rear curtain from the cocked position.

When the rear curtain has reached the terminal end of running down movement, a lever 32 is caused to move in a direction indicated by arrow B and then to strike the top end of a lever 31 and turn it in a counter-clockwise direction. Such movement of lever 31 causes a clockwise movement of a lever 33 which in turn causes disengagement of pawl lever 23 from mirror return control lever 22 to effect movement of mirror 27 to the viewing position illustrated, as a pin 33*a* strikes the tail of lever 23. Such clockwise movement of lever 33 is transmitted through a lever 13 to cause counter-clockwise movement of diaphragm return control lever 11, as lever 13 is acted on a pin 11*c* upwardly extending from lever 11. Disengagement of lever 11 from lever 9 results in the resetting of the diaphragm to the fully open position, as lever 9 is turned counter-clockwise under the action of spring 9*a*.

A resetting mechanism includes a cam disk 18 fixedly connected to a film winding shaft 17, a cam follower 19 in the form of a roller mounted on a crank lever 20, and a control lever 16 operatively connected to crank lever 20 through an intermediary schematically indicated by a dashed line upon counter-clockwise movement of cam disk 17 in half revolution to act on the diaphragm closing down mechanism and the first actuating mechanism through a pin 16*b* and a hooked resilient arm 8*a* respectively, both of which are fixedly mounted on control lever 16. Since the diaphragm drive lever 10 is moved down to a position where an arm 10*c* abuts against a roller 15*a*, one cycle of film winding operation causes clockwise movement of lever 15 from the illustrated position with simultaneous occurrence of counter-clockwise movement of lever 10 until the latter is latched again by pawl lever 12, while the first actuating mechanism is operated by arm 8*a* so that armature 1*b* is brought into contact with the body of first electromagnet 1 against the force of spring 3 by engagement of arm 8*a* with a pin 6*b*. Such counter-clockwise movement of lever 10 causes clockwise movement of mirror drive lever 21 against the force of spring 21*a* which in turn causes clockwise movement of lever 35 against the force of spring 36 in engagement of a resilient arm 39 on lever 35 with the downwardly extending arm of lever 21 until armature 34*a* abuts the body of second electromagnet 24.

Figure 5:
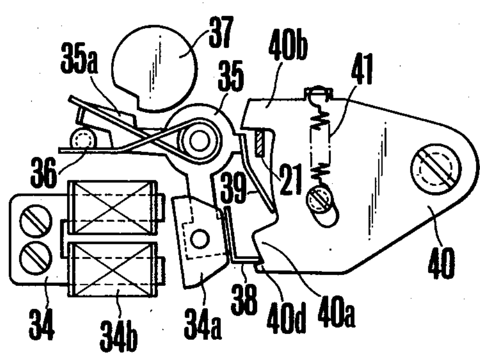

The device of the invention includes a detent member 38 in the form of a bent-off plate fixedly mounted on armature 34*a* at the opposite side to that facing the body of second electromagnet 34, and an arresting member 40 of plate-like shape having two fingers 40*a* and 40*b* arranged so that when the rear curtain latch lever 35 is accidentally caused to follow up the mirror drive lever 21, because of, for example, the lack of sufficient energization of the sollenoid of second electromagnet 34, a pawl 40d of the finger 40a is brought into abutting engagement with the bent-off portion of the detent member 38, and then the mirror drive lever 21 gets stopped by the second finger 40b from further movement which would otherwise cause actuation of the shutter release, as shown in FIG. 5. In the case where the normal operation of the second electromagnet 34 is ensured, the aforesaid further movement of the mirror drive lever 21 is not prevented from occurring, as the arresting member 40 is turned in a clockwise direction from the initial position of FIGS. 1 to 3 to the final position of FIG. 4 against the force of a buffer or return spring 41 which is connected between the member 40 and a pin extending from the camera housing through and outwardly beyond an arcuate slot formed in the member 40. In that final position, the first finger 40a is retracted from the path of movement of the detent member 38. When the film winding lever (not shown) is cocked, the mirror drive lever end 21 is moved away from the second finger 40b, and the arresting member 40 is returned to the initial position under the action of spring 41 after the detent member 38 is taken out of the path of movement of the first finger 40a.

FIG. 2 shows a control circuit for controlling the periods of actuation of the first and second electromagnets 1 and 34 with power supply from a common battery E for which is provided a voltage detecting circuit I constituting part of the device of the invention. The voltage detecting circuit I is connected across the positive and negative buses of the battery E through a switch SW1 which is arranged to be closed when a shutter release button not shown is depressed to a first stroke, and comprises a voltage divider of resistors R1 and R2, a constant voltage source VC, a comparator CP1 having "+" and "−" inputs connected to the outputs of divider and voltage source VC, and a NAND gate G having two inputs, one of which is connected to the output of comparator CP1 and another input which is connected through an inverter I to a point on connection between a resistor R3 and a switch SW2, the latter being arranged to be closed when the shutter release button is depressed from the first to the second stroke. The output of NAND gate G is connected to one tap of the solenoid 1c of the first electromagnet 1, the opposite tap of the solenoid 1c being connected to the output of a delay circuit II which comprises a resistor R4 and a capacitor C1 connected in series with each other. When first switch SW1 is closed, capacitor C1 is charged through resistor R4. Subsequent thereto, second switch SW2 is closed, causing NAND gate G to produce an output of low level, provided that the actual voltage of battery E sensed by comparator CP1 is above a satisfactory operating level. As the solenoid 1c is energized from capacitor C1 to cancel the magnetic flux of permanent magnet 1a, armature 1b is driven by spring 3 to move away from the body of electromagnet 1.

The control circuit further includes a shutter control circuit III comprising a variable resistor RT having a resistance related to the set value of shutter time, a timing capacitor CT connected in series to resistor RT, a counter-start switch SW3 connected across capacitor CT and arranged to be opened when the front curtain of the shutter runs down, and a comparator CP2 connected at a "+" input to the output of timing circuit RT and CT and at a "−" input to a point on connection between resistors R5 and R6. Connected between the positive bus and the output of comparator CP2 is the solenoid 34b of the second electromagnet 34 controlling operation of the rear curtain of the shutter. In order to insure that even when the voltage of battery E nears the satisfactory operating level for the first electromagnet 1, there is no possibility of occurrence of an accidental faulty operation of the second electromagnet 34 which may be encountered in taking an elongated exposure, it is preferred to make the operating level for the second comparator CP2 lower than that for the first comparator CP1 by adjusting the resistors R5 and R6 in resistance value with respect to the resistors R1 and R2.

Now assuming that the actual voltage of battery E falls below the satisfactory operating level, when the shutter button is depressed to the first stroke, the circuits I, II and III are supplied with electrical power from battery, and first comparator CP1 produces an output of low level because the output voltage of voltage divider R1 and R2 is lower than the reference voltage of constant voltage source VC. Upon further depression of the shutter button to the second stroke, therefore, the closure of switch SW2 does not lead to actuation of the first electromagnet 1, as the output of NAND gate G remains at the high level despite of the application of an output of high level from inverter I to gate G.

Alternatively assuming that, while the actual voltage of battery E is sufficient to effect actuation of the first electromagnet 1, the latch lever 35 for the rear curtain does not work satisfactorily due to a malfunction of either the control circuit III or the electromagnet 34 with the armature 34a, the device of the invention is set to operate for the purpose of preventing faulty operation of the shutter in a manner to be described below. It is to be noted here that the aforesaid malfunction may result from either an electrical or a mechanical damage. As examples of the electrical damage, mention may be made of breakage of some of the elements of circuit III or variation with time of conductivity at the soldered portions in or between circuit III and solenoid 34b, these damages resulting in production of no actuating signal from circuit III. As examples of the mechanical damage, mention may be made of adhesion of dust or foreign particles onto the active faces of electromagnet 34 and armature 34a, deviation of the reset position of armature 34a from the normal one, and deformation of the moving parts of the second actuating mechanism. These damages results in failure of retaining the armature 34a in contact with the body of electromagnet 34 by the attractive force of the energized solenoid 34b.

When the shutter button is depressed through the first stroke to the second stroke, the solenoid 1c of first electromagnet 1 is energized to produce a magnetic flux which cancels the magnetic flux of permanent magnet 1a, thereby lever 6 is turned counter-clockwise under the action of spring 3. Such motion of lever 6 causes clockwise movement of intermediate lever 7 against the force of spring 7a which in turn causes disengagement of latch lever 12 from drive lever 10 for the diaphragm. As drive lever 10 is turned clockwise by spring 10a, mirror drive lever 21 follows up lever arm 10b. At a point in time soon after the start of counter-clockwise movement of lever 21, latch lever 35 for the rear curtain is freed from latching connection with the drive lever 21 to start counter-clockwise movement because of the lack of sufficient attraction force of electromagnet 34 to armature 34*a*. Before lever arm 21 reaches second finger 40*b* of arresting member 40, detent member 38 arrives at the camming surface of first finger 40*a*. Further movement of lever 21 is prevented by second finger 40*b* and, after a slight additional movement under the buffering action of spring 41, is arrested by abutting engagement of pawl 40*d* against the detent pawl 38 at a point in time just before the actuating mechanism for the front curtain detects lug 21*b* of mirror drive lever 21, with the resulting position of arresting member 40 being shown in FIG. 5. Thus, faulty operation of the shutter is prevented.

If it happens that the operator accidentally gives a large shock to the camera to permit disconnection of armature 1*b* from the body of electromagnet 1, the device of the invention is operated to arrest the mirror drive lever 21 in a manner similar to that described above. In this case, the operator will next manipulate a not shown release member for a film advancing mechanism as in making a multiple exposure, and then cock the film winding lever to turn the shaft 17 in the direction C, while the film advancing mechanism remains stationary. As shaft 17 is turned to half revolution, cam disk 18 moves lever 20 in engagement with roller 19, and movement of lever 20 is transmitted to resetting control lever 16, thereby lever 16 is turned clockwise to bring armature 1*b* into attracted engagement with the body of electromagnet 1 with permanent magnet 1*a* by resilient arm 8*a* acted on pin 6*b* and also to actuate the resetting mechanism for the diaphragm and mirror, while pin 6*a* is moved away from lever 7. During this resetting operation, lever 15 is turned clockwise with simultaneous occurrence of movement of diaphragm drive lever 10 which in turn causes clockwise movement of mirror drive lever 21. At the end of one cycle of shutter cocking operation, diaphragm drive lever 10 is latched by lever 12, and rear curtain control cam disk 37 is latched by lever 35. As protuberance 35*a* drops into cam notch of disk 37, armature 34*a* is brought into contact with the body of second electromagnet 34 by the action of mirror drive lever 21 on the resilient arm 39, and mirror return control lever 22 is latched by pawl lever 23. When lever 21 is retracted from second finger 40*b* of arresting member 40, the latter is returned to the initial position under the action of spring 41.

It will be appreciated that one embodiment of the invention described above contemplates the use of a mechanism for detecting a malfunction of the exposure determining means in combination with the voltage detector in controlling actuation of the shutter release, thereby it being made possible for the operator to be aware of the faulty operation of the shutter prior to the making of an exposure. In order to discriminate which of the electrical and mechanical damages is responsive to that faulty operation, provision may be made for rendering inoperative the camera release control means when the shutter control means remains de-actuated at the time of depression of the shutter button. An example of this provision is shown in FIG. 6, as including an electromagnet relay whose coil is connected in the power supply circuit for the solenoid 34*b* of second electromagnet 34 of FIG. 2, and a switch 45*a* connected between the voltage detecting circuit I and the solenoid 1*c* and arranged to cooperate with the relay 45 in such a manner that when the relay 45 remains de-energized at the time of closure of the first switch SW1, the first electromagnet 1 is prevented from operating at the time of closure of the second switch SW2.

Figure 7:
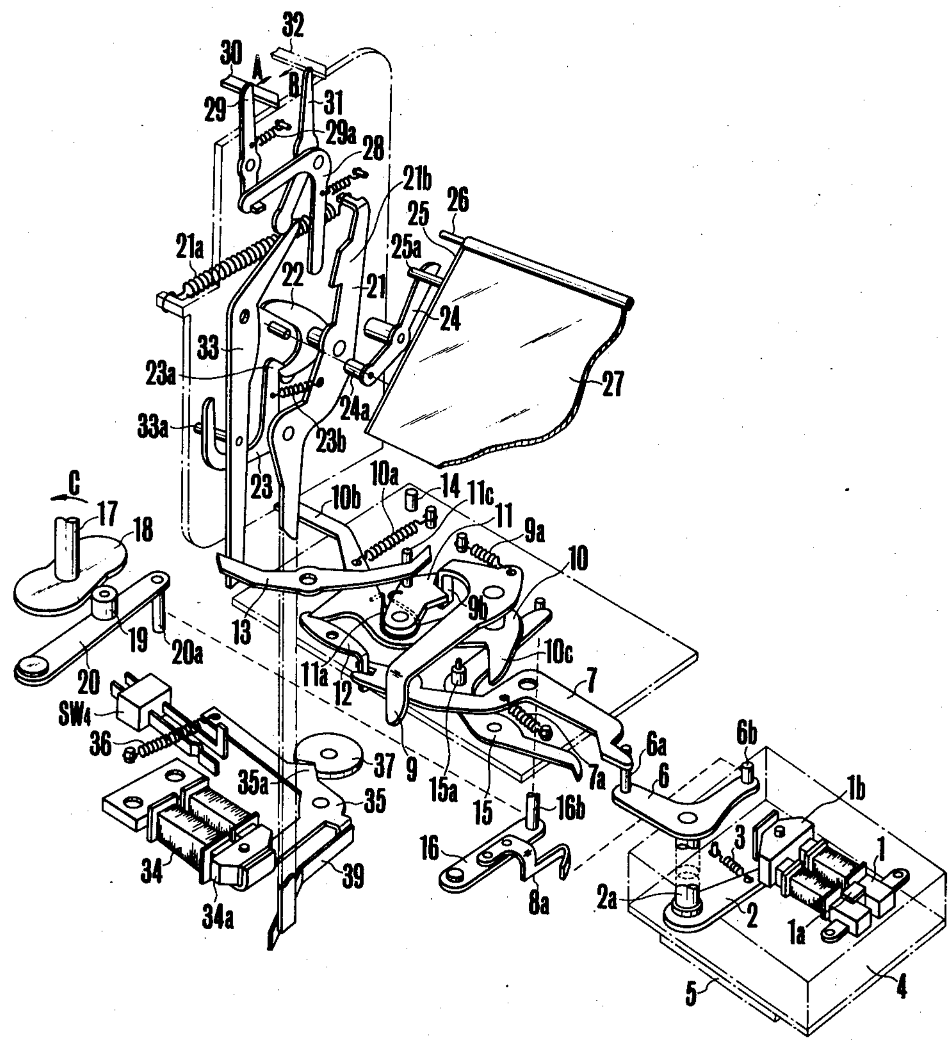
FIG. 7 is an exploded perspective view of another embodiment of the device according to the invention applied to a single lens reflex camera of the same construction as in FIG. 1.
Figure 8:
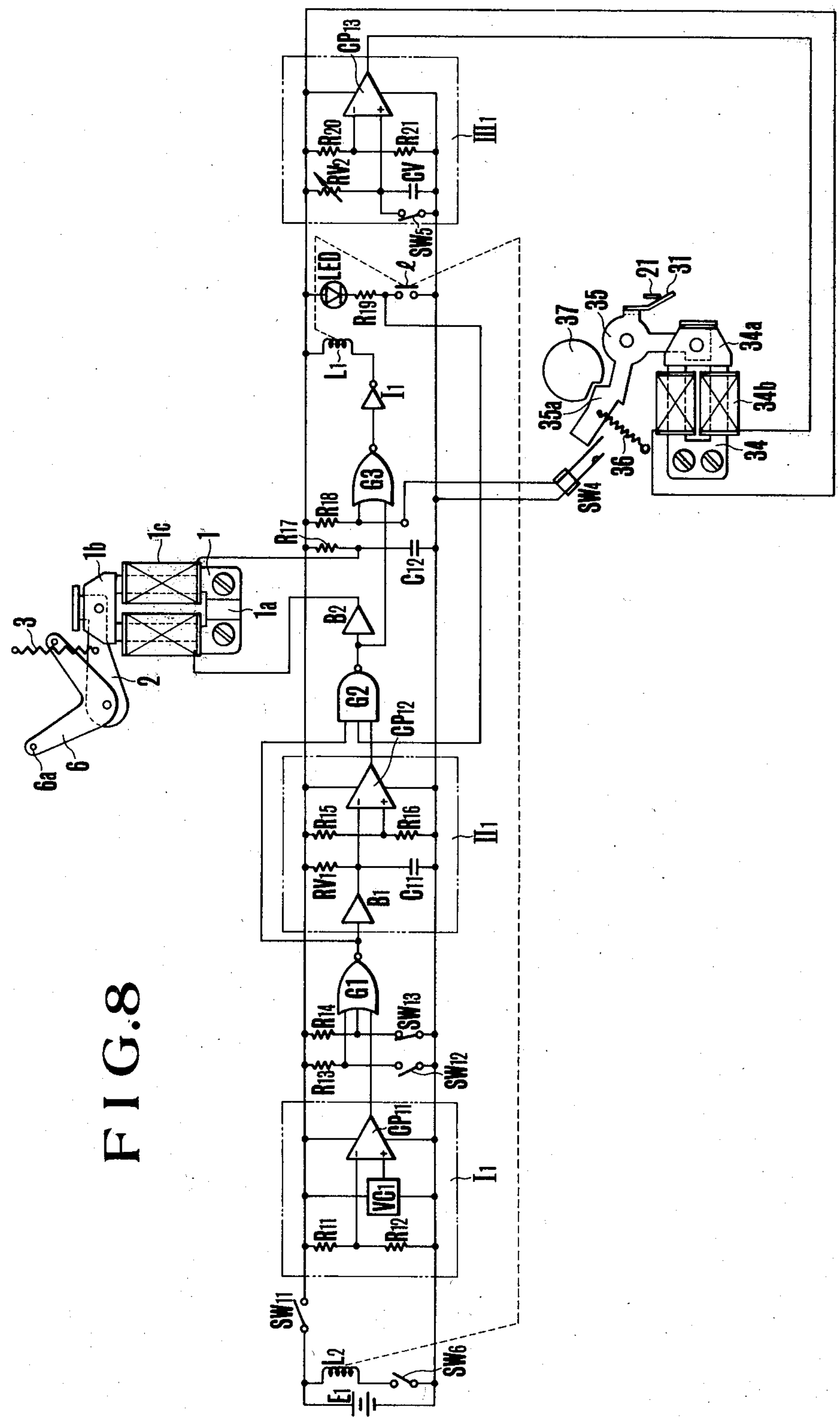
FIG. 8 is a partly elevational view and partly electrical circuit diagram of the device of FIG. 7.

Referring to FIGS. 7 and 8, there is shown another embodiment of the faulty operation preventing device according to the present invention. As shown in FIG. 7, instead of using the arresting member 40 of FIG. 1, a mechanical switch SW4 is made use of as a means for detecting malfunction of the rear curtain latch lever 35 with the actuating electromagnet 34 therefor. This switch SW4 has a movable contact arranged adjacent the latch lever 35 to be closed when the latch lever 35 is turned in a counter-clockwise direction to release the cam disk 37 from the cocked or latched position regardless of whether the operation of the electromagnet 34 with the latch lever 35 is normal or faulty. In the latter case, though a concurrent faulty operation of the shutter is permitted to proceed with the resultant production of a blank or wasteful picture frame, a next actuation of the camera release is prevented from occurring at the time of depression of the shutter button.

FIG. 8 shows the circuitry of the second embodiment of the device of the invention associated with a shutter control circuit $III_1$ of similar construction to that shown in FIG. 2. In addition to a voltage detecting circuit $I_1$ of similar construction to that shown in FIG. 2, a control circuit for controlling actuation of first electromagnet 1 further includes a delay circuit $II_1$ having a time constant slightly longer than that necessary to transmit a camera release action from the first electromagnet 1 to the mirror drive mechanism and shorter than that necessary to permit a further transmission from the mirror drive mechanism 21–24 to the shutter release actuating mechanism 28–30. Positioned between the voltage detecting circuit $I_1$ and the delay circuit $II_1$ is a NOR gate G1 having a first input connected to the output of a comparator CP11, a second input connected to a point on connection between a resistor R13 and a switch SW12, the latter corresponding to the switch SW2 of FIG. 2, and a third input connected to a point of connection between a resistor R14 and a switch SW13, the latter being arranged to be closed when the camera is reset, and having an output connected both to a first input of a NAND gate G2 and to a buffer amplifier B1 which constitutes part of the delay circuit $II_1$. The delay circuit $II_1$ further includes a resistor RV1, a timing capacitor C11 connected in series to the resistor RV1 at a junction point to which the output of the buffer amplifier B1 is connected and which is also connected to a "−" input of a comparator CP12. A "+" input of the comparator CP12 is connected to a reference voltage source in the form of a voltage divider of resistors R15 and R16 connected in series to each other. An output of comparator CP12 is connected to a second input of NAND gate G2 with a third input connected to an output of a faulty operation indicating circuit which can be traced from the positive bus through a light-emitting diode LED, a resistor R19 and a relay contact to the negative bus. This contact cooperates with a first latch relay L1 in such a manner that when a faulty operation of the second electromagnet 34 is detected by switch SW4, the relay L1 is energized to close the contact. The output of NAND gate G2 is connected both to one end of the solenoid 1*c* through a buffer amplifier B2, the opposite end of the solenoid 1*c* being connected to a point of connection between a resistor R17 and a capacitor C12, and to a first input of a NOR gate G3 with a second input connected to a point on connection between a resistor R18 and switch SW4. The output of NOR gate G3 is connected through an inverter $I_1$ to the first latch relay L1. A second latch relay L2 is connected across the battery E1 through a switch SW6 which is arranged to be closed when a not shown sprocket release control button is depressed, thereby the contact is opened.

In operating the camera of FIGS. 7 and 8 in the normal mode, when the shutter button is depressed to the first switch SW11, all the circuits $I_1$, $II_1$, $III_1$ are rendered operative with power supply from the battery E. At this time, comparator CP13 produces an output of low level which is applied to the solenoid 34*b* thereby the armature 34*a* is attracted and retained in contact with the body of second electromagnet 34. As the actual voltage of the battery E is above the satisfactory operating level, the voltage detecting circuit $I_1$ produces an output of low level. Upon further depression of the shutter button, the switch SW12 is closed, causing the NOR gate G1 to produce an output of high level, provided that the camera was reset to close the switch SW13. The delay circuit $II_1$ produces an output of high level before a time interval dependent upon the time constant of the delay circuit $II_1$ elapses. As the indicating circuit remains opened at the contact of the latch relay assembly L1 and L2, all of the three inputs of the NAND gate G2 are at high level so that the output of G2 is of low level, causing sudden energization of the solenoid 1*c* from the charge on the capacitor C12. After that, the diaphragm, mirror and shutter mechanisms are actuated successively in a manner similar to that described in connection with FIGS. 1 to 6. At the termination of duration of a shutter time set in the variable resistor RV2 in circuit $III_1$, the comparator CP13 produces an output of high level, thereby the solenoid 34*b* is de-energized to actuate a release of the rear curtain. At this time, the switch SW4 is closed to apply a signal of low level to the NOR gate G3. However, the latch relay L1 is permitted to remain de-energized because the output of the relay circuit $II_1$ has already changed from the high to the low level and continues to be in the latter state at that time. Subsequent operation proceeds in a similar manner to that described in connection with FIGS. 1 to 6.

Now assuming that the actual voltage of the battery E falls below the satisfactory operating level, when the shutter button is depressed to the first stroke, the voltage detecting circuit $I_1$ produces an output of high level so that the further depression of the shutter button does not lead to the change of the output of the NOR gate G1 from the low to the high level. Therefore, the solenoid 1*c* of the first electromagnet 1 remains de-energized, and the camera release does not start.

Alternatively assuming that, while the active voltage of the battery E is above the satisfactory operating level, the attractive force of the energized second electromagnet on the armature 34*a* becomes smaller than that exerted thereon by the spring 36, when the shutter button is depressed to the full stroke, the diaphragm and mirror drive mechanisms are actuated by the energized electromagnet 1 in a manner similar to that described in connection with the normal mode. As the mirror drive lever 21 is moved away from the resilient arm 31 of the rear curtain latch lever 35, the latter is turned in a counter-clockwise direction to close the switch SW4. At this time, the output of the comparator CP12 in the delay circuit $II_1$ remains unchanged from the high level so that the closure of the switch SW4 causes the output of the NOR gate G3 to change from the low to the high level. This output of G3 after being inverted by the inverter I1 is applied to the first latch relay L1 to close the contact thereof and, at the same time, to energize the light-emitting diode LED, thereby the photographer is informed of the fact that a faulty operation of the shutter has occurred, as the rear curtain follows up the front curtain with production of a blank frame exposure. So long as the light-emitting diode LED is lit, the NAND gate G2 is gated off not to pass the actuating signal from the gate G1 to the first electromagnet 1. When the reset control switch SW6 is closed to energize the second latch relay L2, the indicating circuit is broken so that after the film winding lever is cocked without causing the film to be advanced through one frame, because of the depression of the release button for the sprocket, the operator is enabled to make a next exposure in the normal mode, provided that the preceeding faulty operation of the shutter was caused by a simple and instantaneous mechanical damages such as an insufficient resetting operation of the armature 34*a*.

It will be appreciated that the second embodiment of the invention provides a camera release control circuit with a faulty operation indicating control circuit responsive to a malfunction of the shutter release actuating device for latching the camera release actuating device in the inoperative position after the concurrent actuation of the camera release. This camera release control circuit further includes a voltage detecting circuit responsive to the falling of the actual voltage of the electrical power source for latching the camera release actuating device in the inoperative position before the concurrent actuation of the camera release. Since an operating member for releasing a film advancing mechanism from operative connection with a shutter charging mechanism may be utilized as a resetting means for the faulty operation indicating circuit, that portion of the film frames which was exposed with the faulty operation of the shutter can be used in the next exposure with the normal operation of the shutter. Thus, only when the functions of the diaphragm followed by mirror release and shutter release actuating devices are detected as simultaneously normal, an exposure of the film can be made to save a number of frames which would be otherwise subject to incorrect exposures.

What is claimed is:

1. A faulty operation preventing device for a single lens reflex camera comprising:

(a) mirror drive means;

(b) shutter opening control means; said means being actuated in response to movement of said mirror drive means;

(c) actuating means for actuating said mirror drive means;

(d) electromagnetic release means for causing operation of said actuating means to start;

(e) electrical power supply means;

(f) voltage detecting means positioned between said electrical power supply means and said electromagnetic release means and responsive to whether or not the voltage of said electrical power supply means is above a predetermined level for permitting the supply of electrical power to said electromagnetic release means when the voltage is above the predetermined level and for preventing the supply of electrical power to the electromagnetic release means when the voltage is below the predetermined level;

(g) exposure time determining means connected to said power supply means; said means being actuated in response to drive of said shutter opening control means and producing a shutter closing signal after a certain time;

(h) electromagnetic means connected to said exposure time determining means; said means being set by the shutter closing signal of said exposure time determining means from an energized state to a de-energized state;

(i) movable means movable between a position where it is attracted to said electromagnetic means and a position where it is separated from said electromagnetic means;

(j) shutter closing control means; said means being latched when said movable means is in the attraction position and being released from the latching connection to be actuable when said movable means is in the separate position; and (k) detecting means movable from a first position to a second position in response to movement of said mirror drive means; said means being latched by said movable means when said movable means is moved to the separate position before said detecting means is moved from the first to the second position, and being unlatched by said movable means when said movable means is moved to the separate position after said detecting means is moved from the first to the second position;

whereby when said detecting means is latched by said movable means, said mirror drive means is prevented from moving so that said shutter opening control means is not actuated.

2. A device according to claim 1, wherein said movable means has bias means for moving said movable means to the separate position, and said movable means is retained in the attraction position against the force of said bias means by said mirror drive means before it is driven for movement.

3. A device according to claim 2, further including winding-up means causing the moved mirror drive means to be returned, said means when operated to effect returning movement of said mirror drive means causing said movable means to be moved from the separate position to the attraction position.

4. A device according to claim 3, wherein said detecting means has another bias means for retaining said detecting means in the first position, and said another bias means moves said detecting means from the second to the first position when said mirror drive means is returned.

5. A device according to claim 1, wherein the operating voltage level of said exposure determining means is set to be lower than that of said voltage detecting means.

6. A device according to claim 1, further including another detecting means for detecting whether or not said electromagnetic means is in the conducting state, said means allowing the supply of electrical power to said electromagnetic release means when the conducting state of said electromagnetic means is detected, and preventing the supply of electrical power to said electromagnetic release means when the non-conducting state of said electromagnetic means is detected.

7. A faulty operation preventing device for a camera comprising:

(a) shutter opening control means;

(b) actuating means for actuating said shutter opening control means;

(c) electromagnetic release means for causing operation of said actuating means to commence;

(d) electrical power supply means for the supply of power;

(e) voltage detecting means connected between said electrical power supply means and said electromagnetic release means and responsive to whether or not the voltage of said electrical power supply means is above a predetermined level for allowing the supply of electrical power to said electromagnetic release means when the voltage is above the predetermined level and for preventing the supply of electrical power to the electromagnetic release means when the voltage is below the predetermined level;

(f) exposure time determining means connected to said power supply means, said means being actuated in response to said shutter opening control means being driven and producing a shutter closing signal after a certain time;

(g) shutter closing control means;

(h) movable means shiftable between a first position in which said shutter closing control means is rendered inoperative and a second position in which said shutter closing control means is rendered operative;

(i) shutter closing control electromagnetic means which causes said movable means to move from the first position to the second position when a shutter closing signal is applied thereto from said exposure time determining means; and (j) detecting means which operates in association with said actuating means, said detecting means being arranged to be locked by said movable means when the movable means has been shifted to the second position before operation of the detecting means and not to be locked by said movable means when the movable means is shifted to the second position after the operation of the detecting means, the driving operation of said actuating means being prevented and said shutter opening control means thus remaining inoperative when said detecting means is locked by said movable means.

8. A faulty operation preventing means for a camera comprising:

(a) shutter opening control means;

(b) actuating means for actuating said shutter opening control means;

(c) electromagnetic release means for causing operation of said actuating means to start;

(d) electrical power supply means;

(e) voltage detecting means connected between said electrical power supply means and said electromagnetic release means and responsive to whether or not the voltage of said electrical power supply means is above a predetermined level for allowing the supply of electrical power to said electromagnetic release means when the voltage is above the predetermined level and for preventing the supply of electrical power to the electromagnetic release means when the voltage is below the predetermined level;

(f) exposure time determining means connected to said power supply means; said means being actuated in response to drive of said shutter opening control means and producing a shutter closing signal after a certain time;

(g) electromagnetic means connected to said exposure time determining means; said means being set by the shutter closing signal of said exposure determining means from an energized state to a de-energized state;

(h) movable means movable between a position where it is attracted to said electromagnetic means and a position where it is separated from said electromagnetic means;

(i) bias means for moving said movable means to the separate position;

(j) retaining means for retaining said movable means in the attraction position against the force of said bias means; said means releasing said movable means from the latched position in response to operation of said actuating means; and (k) detecting means for detecting whether or not said movable means is moved from the attraction position to the separate position when said movable means is released from the latched position by said retaining means; said means permitting the supply of electrical power to said electromagnetic release means when said movable means is not moved, and preventing the supply of electrical power to said electromagnetic release means when said movable means is moved;

whereby when the supply of electrical power to said electromagnetic release means is prevented by said detecting means, the next exposure and those that follow cannot be made.

9. A faulty operation preventing means for a camera according to claim 8, wherein said detecting means is provided with switch means which is arranged to open and close in response to the shifting action of said movable means and also with a signal generating means which produces signals according to opening and closing of said shutter means, said signal generating means being arranged to produce a first signal in response to the switching action of said switching means when said movable means is in a position where it is attracted to said electromagnetic means and to produce a second signal when said movable means shifts to a position where it is separated from said electromagnetic means.

10. A faulty operation preventing means according to claim 9, including another detecting means which detects whether the signal produced by said signal generating means is the first signal or the second signal, said another detecting means being arranged to permit power supply to said electromagnetic release means when the first signal is detected and to prevent the power supply to the electromagnetic release means when the second signal is detected.

11. A faulty operation preventing means according to claim 10, including another signal generating means which produces a signal only for a predetermined length of time until said electromagnetic means is de-energized, said another signal generating means being arranged to render said signal generating means operative only while said signal is being generated.

12. A faulty operation preventing means according to claim 10, further including display means which performs a display action when said second signal is detected by said another detecting means.

13. A faulty operation preventing means according to claim 10, wherein said another detecting means is provided with a first latch relay and a relay contact, said first latch relay being energized by the second signal from said signal generating means to close said relay contact, and power supply to said electromagnetic release means being prevented in response to the closure of said relay contact.

14. A faulty operation preventing means according to claim 13, further including a second latch relay for opening said relay contact, and another switch means which controls energization of said second latch relay.

* * * * *